United States Patent
Koleff et al.

[15] 3,646,870
[45] Mar. 7, 1972

[54] DEVICE FOR BRAKING OF SHUTTER BLADES OR THE LIKE

[72] Inventors: Boris Koleff, Munich; Erich Nagel, Anzing, both of Germany

[73] Assignee: Agfa-Gevaert Aktiengesellschaft, Leverkusen, Germany

[22] Filed: May 13, 9170

[21] Appl. No.: 36,884

[30] Foreign Application Priority Data

May 17, 1969 Germany ................. P 19 25 312.4

[52] U.S. Cl. .................................................. 95/59, 95/11 R
[51] Int. Cl. ............................................................. G03 9/10
[58] Field of Search .................... 95/31 R, 42, 53 R, 55, 58, 95/59, 60, 62, 63, 65, 11; 352/136, 137, 138, 204; 355/71

[56] References Cited

UNITED STATES PATENTS

| | | |
|---|---|---|
| 1,535,930 | 4/1925 | MacDonald ..................... 95/31 FM |
| 1,002,897 | 9/1911 | Brown ................................... 95/53 |
| 2,953,076 | 9/1960 | Leuschke et al. .................. 95/53 X |
| 486,397 | 11/1892 | Eastman ................................ 95/60 |

Primary Examiner—Joseph F. Peters, Jr.
Attorney—Michael S. Striker

[57] ABSTRACT

A braking device for shutter blades or the like which comprises a pivotable actuating member normally extending into the path of movement of the blade and serving to displace a braking member which is thereby urged against the blade, preferably in a direction at right angles to the direction of movement of the blade, to produce a controlled braking action. The braking member is integral with or is coupled to the actuating member by a torsion spring or the like. Elastic cushions are provided on the actuating and braking members in such positions that the cushion of the actuating member is struck by the moving blade and the cushion of the braking member strikes against the blade in response to resulting displacement of the actuating member.

14 Claims, 2 Drawing Figures

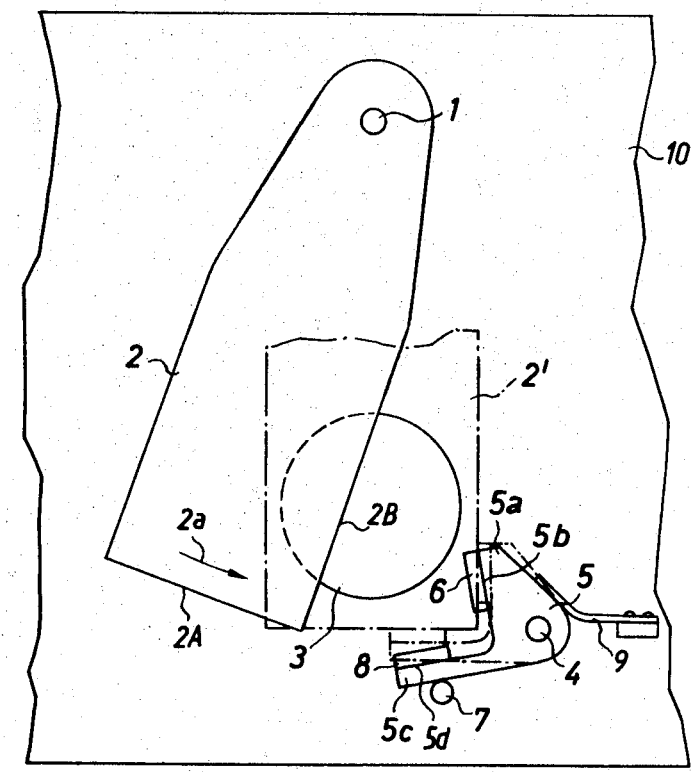

DEVICE FOR BRAKING OF SHUTTER BLADES OR THE LIKE

BACKGROUND OF THE INVENTION

The present invention relates to photographic, cinematographic or other types of apparatus wherein a driven member is rapidly propelled from a first to a second position and must be braked at least during a certain stage of such movement.

It is known that the blade or blades of a shutter in a photographic camera must be rapidly moved from an open or cocked to a closed position to thus insure that the exposure of a film frame to scene light is completed within a prescribed interval of time which can be selected automatically or by hand. Many photographic cameras or like apparatus are also provided with filters which are mounted on carriers arranged to move to and from a position in which one or more filters extend across the path of incoming scene light. It is desirable to mount the shutter blades and/or the filter carrier in such a way that such driven members can move rapidly and that they assume accurately determined positions when the movement is completed. Problems arise when a rapidly moving shutter blade or the like is caused to impinge against a stop because the blade is likely to rebound and to thus affect the quality of exposures, especially if the extent of rebounding suffices to permit exposure of a film frame to additional scene light. Moreover, such method of arresting a shutter blade results in excessive wear. Similar problems arise in connection with the control of movements of carriers for filters.

Certain cameras are provided with devices which are designed to produce a braking action and to thus insure that a shutter blade or an analogous driven member cannot rebound when it reaches a predetermined position. A drawback of conventional braking devices is that they are too bulky, too expensive and/or that their actuation necessitates the application of substantial forces. Furthermore, the wear on conventional brakes is rather high so that their action becomes unreliable after a certain period of use.

SUMMARY OF THE INVENTION

An object of the invention is to provide a still camera, a motion picture camera or other types of apparatus or instruments with a novel braking device which can arrest a driven part in an accurately determined position, which is simple and inexpensive, which is capable of standing long periods of use, and which can produce a predictable braking action during a desired interval of movement of a driven part toward its intended position.

Another object of the invention is to provide a compact and lightweight braking device which can be employed in many types of presently known photographic apparatus or the like to control movements of shutter blades, carriers for filters or analogous driven parts.

A further object of the invention is to provide a braking device whose components automatically reassume their normal positions when the driven part is caused or permitted to leave its intended position.

An additional object of the invention is to provide a still camera or a motion picture camera which embodies the improved braking device.

The invention is embodied in a photographic camera, a cinematographic apparatus or the like which comprises a driven member movable along a predetermined path from a first position to a second position in a predetermined direction, e.g., clockwise or anticlockwise about a fixed axis, the path having a portion along which the driven member moves during the last stage of its movement toward the second position, an actuating member normally extending into the just mentioned portion of the path and being displaceable by the driven member while the latter approaches its second position, and a braking member which is arranged to engage and decelerate the driven member in response to displacement of the actuating member. The actuating member may constitute one arm of a bellcrank the other arm of which constitutes the braking member. Such bellcrank can be mounted for pivotal movement about a second fixed axis which is preferably parallel to the axis of the driven member so that, when the driven member strikes against the actuating member, the braking member is caused to move substantially radially and toward the axis of the driven member and to thus produce a rapid, controlled and effective braking action which is proportional to kinetic energy of the driven member and which can decrease to zero when the driven member comes to a halt in the second position.

It is also possible to employ a braking member which is movable with reference to the actuating member and is coupled thereto by means of a spring or the like.

The novel features which are considered as characteristic of the invention are set forth in particular in the appended claims. The improved braking device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic elevational view of a portion of a photographic camera which embodies one form of the improved braking device and wherein the second position of the driven member is indicated by phantom lines; and FIG. 2 is a schematic elevational view of a second braking device wherein the actuating member is coupled to the braking member by a resilient element.

DESCRIPTION OF THE PREFERRED EMBODIMENTS

FIG. 1 illustrates a portion of a photographic camera which comprises a support 10 for the pivot 1 of a driven member here shown as a shutter blade 2. The pivot 1 can constitute the armature of a rotary electromagnet which can be energized to rapidly propel the blade 2 from a first position to the phantom-line second position 2'. In such second position, the blade 2 overlies an opening 3 which admits scene light to an unexposed film frame, not shown. The direction in which the blade 2 moves along an arcuate path is indicated by the arrow 2a.

In accordance with a feature of the invention, the camera is further provided with an actuating member 5a which constitutes one arm of a bellcrank 5 turnable on a pin 4 which is parallel to the pivot 1. The pin 4 is mounted on the support 10. The bellcrank 5 includes a second arm 5c which is coplanar with the blade 2 and actuating member 5a. In its solid-line normal position, the actuating member 5a extends into that portion of the path of movement of the blade 2 in which the outermost and foremost part of the blade advances during the last stage of its movement toward the second position 2', i.e., while the blade approaches such second position. The face 5b of the actuating member 5a is provided with a cushion 6 of soft elastomeric material, e.g., natural or synthetic rubber having a preferably high coefficient of friction. In the normal position of the actuating member 5a, the other arm 5c of the bellcrank 5 abuts against a stationary stop 7 on the support 10. The arm 5c constitutes a braking member and has a face 5d which is also provided with a soft elastic cushion 8 preferably consisting of the same material as the cushion 6. In the embodiment of FIG. 1, the braking member 5c is integral with the actuating member 5a. The solid-line position of the braking member 5c is its idle or inactive position, i.e., the cushion 8 does not engage the blade 2 and is at least slightly spaced from the outer end face 2A of the blade. The substantially radially extending front end face 2B of the blade 2 can strike against the cushion 6 in the normal position of the actuating member 5a. It is assumed that the support 10 is located in a vertical or substantially vertical plane, i.e., that the axes of the pivot 1 and pin 4 are horizontal and that the bell crank 5 tends to assume the illustrated solid-line position under the action of gravity. As stated before, the braking member 5c then abuts against the stop 7. The distribution of mass in the bellcrank 5 is preferably such that the latter rapidly and automatically returns to the illustrated solid-line position as soon as the blade 2 leaves its second position 2' and as long as the support 10 is located in or close to a vertical plane. A relatively weak return spring 9 may but need not be provided to bias the bellcrank 5 to the solid-line position of FIG. 1 irrespective of the orientation of the support 10. The actuating member 5a makes with the braking member 5c an angle of substantially 90° because the end faces 2A, 2B of the blade 2 are normal or nearly normal to each other.

The operation:

The electromagnet which includes the pivot 1 is energized in any conventional manner to effect closing of the shutter by causing the blade 2 to rapidly turn in a counterclockwise direction toward the second position 2' whereby the blade moves through the intermediate position which is shown by solid lines. The braking member 5c abuts against the stop 7 so that the cushion 6 of the actuating member 5a extends into the path of movement of the blade 2, i.e., into the path of movement of the front end face 2B. The cushion 8 of the braking member 6 is adjacent to but still spaced from the path of movement of the outer end of face 2A. When the front end face 2B strikes against the cushion 6, the bellcrank 5 pivots clockwise toward the phantom-line position of FIG. 1 whereby the cushion 8 moves toward and engages the outer end face 2A with a force which increases in response to clockwise pivotal movement of the bellcrank 5. The cushions 6 and 8 cooperate to arrest the blade 2 in an accurately determined position, namely, in the second position 2'. The braking action of the cushion 8 is proportional to the kinetic energy of the blade 2. The elasticity of the cushions 6 and 8 insures that the deceleration of the blade 2 during the last stage of its movement toward the second position 2' consumes a certain interval of time, i.e., that such deceleration takes place while the blade covers a certain portion of the distance between its first and second positions.

It will be seen that, during deceleration of the blade 2, the braking action which is produced by the cushion 8 on the braking member 5c is effective in a direction substantially at right angles to the direction of movement of the blade, namely, radially of and toward the pivot axis (pivot 1) of the blade. This is desirable because the pivot 1 can simultaneously serve as an abutment which takes up the braking stresses. However, it is equally within the purview of the invention to construct and mount the actuating and braking members in such a way that the braking member or its cushion acts on the blade 2 in a direction which is parallel to the axis of the pivot 1, i.e., at right angles to the plane of FIG. 1. This is desirable when the deceleration of the blade should consume a relatively long interval of time. A braking member which applies a braking force in parallelism with the axis of the pivot 1 can be arranged to flex the blade 2 during deceleration whereby the thus flexed part of the blade may but need not rub against the support 10. Suitable guide means (not shown) can be provided for the braking member 5c and/or for the braking member which is designed to flex the blade 2 during deceleration.

When the pressure of the front end face on the cushion 6 of the actuating member 5a decreases, the pressure of the cushion 8 against the outer end face also decreases so that the bellcrank 5 offers little or no resistance to return movement of the blade 2 to first position. Thus, the return movement of the blade 2 to open or cocked position necessitates the exertion of a negligible force.

FIG. 2 illustrates a modified braking device. The braking member 105c is pivotable about a pin or shaft 104 in response to pivoting of an actuating member 105a which is also pivotable on the shaft 104. However, the members 105a, 105c can turn independently of each other. The coupling between these parts comprises a resilient element here shown as a torsion spring 111. The bias of this spring increases when the actuating member 105a continues to pivot clockwise in response to movement of the blade toward second position while the braking lever 105c already engages the adjacent outer end face of the moving blade. The arrangement of FIG. 2 can be employed when the deceleration of the blade should take up relatively long interval of time. The function of cushions 106 and 108 on the members 105a, 105c is the same as that of the cushions 6, 8 shown in FIG. 1.

It is clear that the structure shown in FIG. 1 and/or 2 is susceptible of many additional modifications without departing from the spirit of our invention. As stated above, the driven member 2 need not constitute a shutter blade but may be used as a carrier for one or more filters (not shown) which are movable into and away from the path of scene light. Furthermore, the driven member need not be moved by an electromagnet but rather by one or more springs or the like. Still further, the spring 9 of FIG. 1 can be replaced with a helical spring, a torsion spring or other biasing means. The structure of FIG. 2 may also include means for biasing the members 105a, 105c to their normal positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus of the character indicated, particularly in a photographic apparatus, a combination comprising a driven member movable along a predetermined path from a first position to a second position in a predetermined direction, said path having a portion along which said driven member moves while approaching said second position; an actuating member normally extending into said portion of said path and displaceable by said driven member while the latter approaches said second position; and a braking member arranged to frictionally engage and decelerate said driven member in response to displacement of said actuating member.

2. A combination as defined in claim 1, wherein said driven member is a shutter blade.

3. A combination as defined in claim 1, wherein said driven member is a filter carrier.

4. A combination as defined in claim 1, wherein said braking member is arranged to move substantially at right angles to said predetermined direction in response to displacement of said actuating member.

5. A combination as defined in claim 1, wherein said actuating member constitutes one arm and said braking member constitutes another arm of a bellcrank which pivots about a predetermined axis in response to displacement of said actuating member.

6. A combination as defined in claim 1, wherein said actuating member is integral with said braking member.

7. A combination as defined in claim 1, wherein said actuating member comprises a first elastic cushion which is engaged by said driven member while the latter approaches said second position and said braking member comprises a second elastic cushion which engages and decelerates said driven member in response to displacement of said actuating member.

8. A combination as defined in claim 7, wherein at least one of said cushions consists of a material having a high coefficient of friction.

9. A combination as defined in claim 1, wherein said actuating member is pivotable about a predetermined axis and wherein said braking member is also pivotable about said axis, and further comprising coupling means for pivoting said braking member against said driven member in response to pivoting of said actuating member by said driven member.

10. A combination as defined in claim 9, wherein said coupling means comprises resilient means.

11. A combination as defined in claim 1, wherein said actuating member tends to extend into said portion of said path under the action of gravity.

12. A combination as defined in claim 1, further comprising means for biasing said actuating member into said portion of said path.

13. A combination as defined in claim 1, wherein said driven member is pivotable along said path about a predetermined axis and wherein said braking member is arranged to move substantially radially of and toward said axis in response to displacement of said actuating member.

14. A combination as defined in claim 13, wherein said braking member is pivotable about a second axis which is at least substantially parallel to said predetermined axis.

* * * * *